United States Patent [19]

Billingsley et al.

[11] 4,186,950
[45] Feb. 5, 1980

[54] COUPLING APPARATUS

[75] Inventors: Lloyd E. Billingsley; Raymond E. Latham, both of Houston, Tex.

[73] Assignee: Comex Marine Services, Inc., Houston, Tex.

[21] Appl. No.: 833,085

[22] Filed: Sep. 14, 1977

[51] Int. Cl.² ............................................. F16L 27/06
[52] U.S. Cl. .................................. 285/270; 285/321; 285/323; 285/348
[58] Field of Search .............. 285/261, 270, 323, 104, 285/101, 102, 100, 184, 321, 233, 232, 348

[56] References Cited

U.S. PATENT DOCUMENTS

| | | | |
|---|---|---|---|
| 900,603 | 10/1908 | Silk | 285/270 |
| 904,534 | 11/1908 | Henderson | 285/184 X |
| 1,754,639 | 4/1930 | Meyer | 285/101 |
| 2,283,975 | 5/1942 | Dillon | 285/104 |
| 2,434,846 | 1/1948 | Hagan | 285/232 X |
| 2,714,021 | 7/1955 | Froidevaux | 285/102 |
| 2,749,154 | 6/1956 | Smith | 285/321 X |
| 2,755,109 | 7/1956 | Risley | 285/232 X |
| 2,787,479 | 4/1957 | Burns | 284/232 |
| 3,248,135 | 4/1966 | Meripol | 285/323 |
| 3,733,093 | 5/1973 | Seiler | 285/348 X |
| 3,741,591 | 6/1973 | Fessler et al. | 285/321 X |
| 3,874,706 | 4/1975 | Arnold | 285/261 X |
| 4,005,881 | 2/1977 | Burton et al. | 285/261 X |
| 4,045,054 | 8/1977 | Arnold | 285/18 |

Primary Examiner—Thomas F. Callaghan
Attorney, Agent, or Firm—Bill B. Berryhill

[57] ABSTRACT

Coupling apparatus capable of joining first and second conduits in a nonaligned articulated relationship may comprise: a male member having a radially enlarged end portion thereon; a female member into which the male member may be inserted; a seal assembly for sealing between the male and female members; a gripping assembly carried by the female member and radially movable from a normally expanded position, in which the male member may be freely inserted and removed from the female member, to a contracted position gripping the enlarged end portion of the male member, preventing its removal and locking it in a fixed, articulated relationship with the female member; and a load ring carried by the female member and axially movable from a first position, allowing the gripping assembly to assume its normal expanded position, to a second position engaging and forcing the gripping assembly into its contracted position.

9 Claims, 6 Drawing Figures

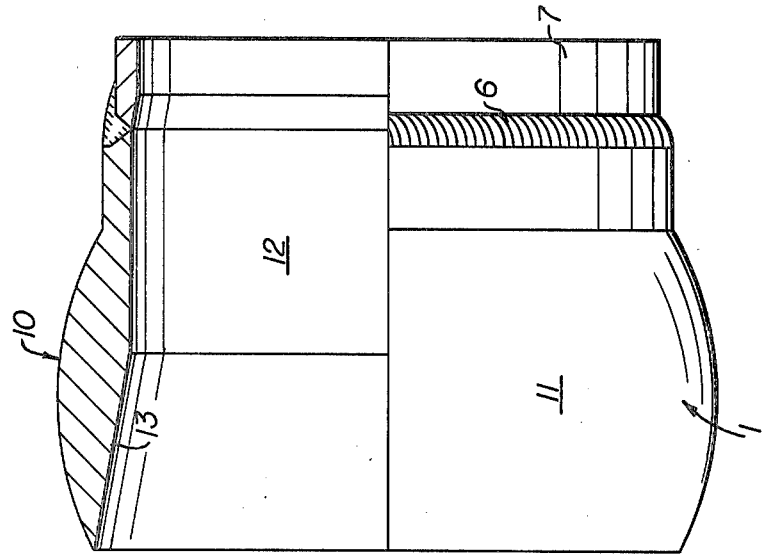
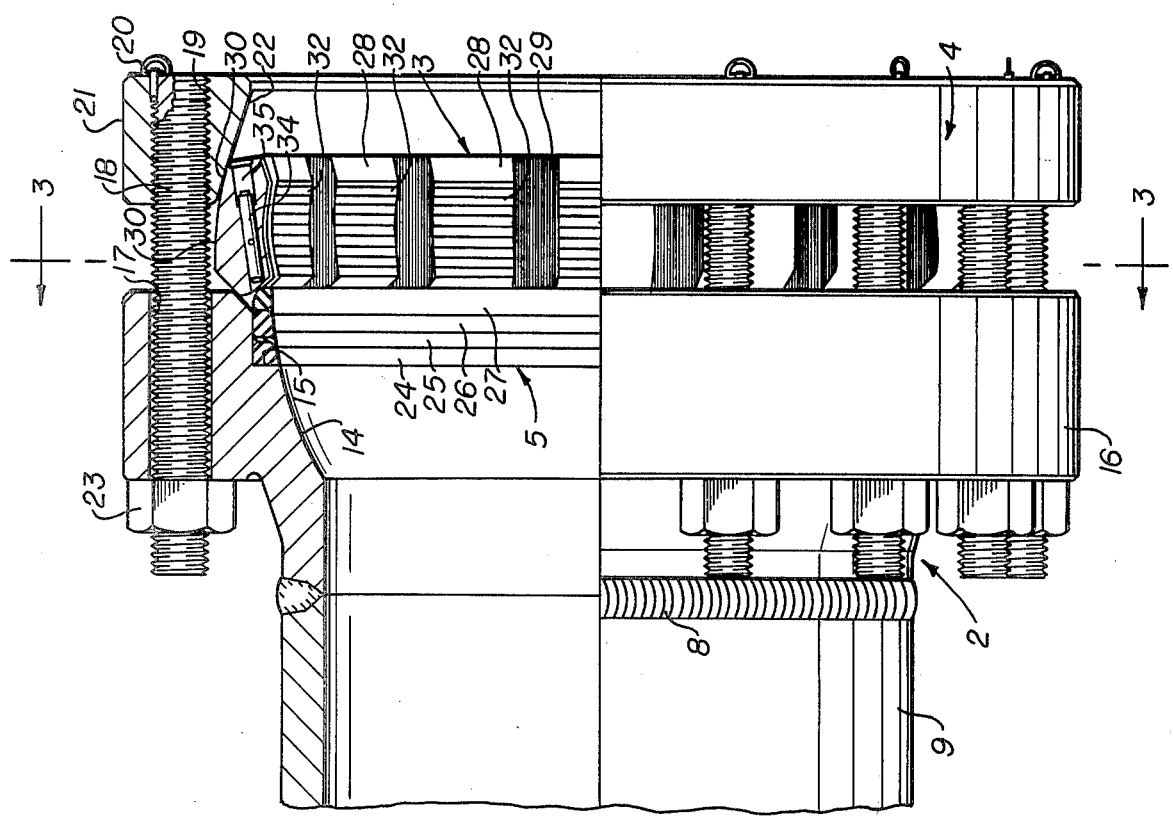
fig.1

COUPLING APPARATUS

BACKGROUND OF THE INVENTION

1. Field of the Invention

The present invention pertains to coupling apparatus for joining elongated members such as conduits or pipes. Specifically, it pertains to coupling apparatus suitable for connecting nonaligned pipes and conduits such as may be frequently necessary in submarine installations.

2. Description of the Prior Art

Many coupling devices have been developed for joining the ends of two conduits or for coupling a conduit to some other apparatus. One general type of a coupling device is sometimes referred to as a ball and socket joint or coupling, in which the ball (male) member is attached to one conduit and the socket (female) member to another. The male member is received within the female member and some means is provided for holding the two members together.

In recent years, couplings of the ball and socket type have been developed for submarine installations. Some of these couplings have been used for providing a flexible joint for connecting a marine riser or conduit to a submarine wellhead so as to provide communication between the submarine wellhead and a drill ship or the like. With these couplings, a ball member may be latched into the socket member by a radially deformable collar which is contracted to the holding position by an annular piston or some other similar device. Such flexible couplings permit limited relative rotary and bending movement between the coupled conduits. For submarine wellhead and riser type installations, this is desirable. Such flexible ball and socket couplings may be seen in U.S. Pat. Nos. 3,333,870; 3,450,421; and 3,695,633.

The flexible coupling designs for wellhead riser installations are not necessarily suitable for connecting pipe sections of a high pressure circulating fluid pipeline which may lie for prolonged periods on the sea floor. Although ball and socket couplings may be useful for connecting sections of such a pipeline which very frequently are not coaxially aligned, it is necessary to provide some sort of locking or gripping system which grips the ball with sufficient force to prevent it from turning or swiveling in the joint. In this manner, the connected conduits become a fixed unit with good mechanical continuity capable of withstanding the strong forces and stresses existing in pipelines.

Ball and joint couplings are now being developed, similar to ball and joint submarine wellhead/riser couplings, for connecting sections of submarine pipelines. One such connector may be seen in U.S. Pat. No. 3,874,706. However, like in most submarine wellhead/riser couplings, this coupling utilizes hydraulic mechanisms and it is necessary to use a pressurized fluid to actuate the locking mechanism. While such couplings are useful for installations situated near a platform which supports a central hydraulic system to feed the hydraulic mechanisms, they are poorly adapted for fitting in a pipeline at points that may be inaccessible to a central hydraulic system. Furthermore, in a pipeline application, the ball and socket joint must be rigidly maintained by maintaining hydraulic pressure thereon or by using a fluid, such as polymerizable resin, which hardens within the coupling so as to keep it fixed in the locked position. Such a method of fixing the locking system, as the latter, has the disadvantage of being irreversible, preventing uncoupling and replacement of malfunctioning components.

In a more recently developed coupling, shown in U.S. Pat. No. 4,040,650, a purely mechanical worm and worm wheel locking mechanism is provided instead of hydraulic type mechanisms. The worm and worm wheel arrangement allows the coupling to be reversible, i.e. it may be coupled and uncoupled with the same ease. It also allows the coupling to be operated with a substantial mechanical advantage. The inherent self-locking design of worm and worm wheel arrangements makes the coupling autonomous, operable at almost any location and capable of being left in its locked position without having to maintain any applied force thereon. Thus, it is more suitable for connecting conduits in a pipeline than hydraulically operated ball and socket couplings.

In both of the hydraulically or mechanically operated ball and socket couplings of the prior art, the means for gripping the ball usually includes metallic gripping elements which are radially movable from an outward position, in which the ball is freely permitted to enter and exit the socket, to inward positions firmly and rigidly gripping the ball and locking the ball and socket in a fixed articulated relationship. The mounting of the gripping elements is somewhat complicated, particularly mounting them in such a way as to ensure opening or return to the outward position for allowing removal of the ball. Furthermore, in most of the prior art ball and socket couplings suitable for pipeline use, including those just discussed, some sort of axially movable sleeve cam member is provided for camming or forcing the gripping elements into gripping contact with the ball member. Such sleeve members of the prior art generally move in an axial direction toward the conduit to which the ball member is attached. This means that the components of the force applied to the gripping elements includes at least some force component which is tending to force the ball member axially out of the socket. This force, through it be small, may be sufficient to prevent the coupling from being rigidly locked in the necessary articulated relationship. Furthermore, this force may be sufficient to prevent maintenance of the necessary sealing forces on the annular seal which is normally provided between the ball member and the socket member. This is particularly true if there is any axial play or slack present in the machined parts associated with the gripping assembly of the coupling.

SUMMARY OF THE INVENTION

In the present invention, a ball and joint type coupling is disclosed which has certain advantages over those of the prior art, making it more suitable for connecting conduits in a pipeline. Specifically, the coupling of the present invention may provide a fluidtight connection between conduits which are not perfectly aligned, fixing the conduits together in such a way that they become a solid, fixed, articulated unit, withstanding the forces and stresses which may be placed thereon. Unlike some of the hydraulic couplings of the prior art, the coupling of the present invention is autonomous and reversible so that the pipes connected thereby can also be uncoupled with relative ease. Such coupling is effected without the use of hydraulic power and may be coupled with conventional wrenches. One of the most important characteristics of the coupling of the present invention is the application of forces to the gripping assembly in such a way that there are no force components which tend to force the ball member out of the socket, as in the prior art, but instead tend to force the ball member toward tighter engagement with the socket member. This assures a tight rigid connection and assures that the seal assembly is properly and continually activated.

These objectives are obtained by providing a ball or male member for attachment to one conduit and a socket or female member for attachment to the other and into which the male member may be inserted. A ring gripping assembly is carried by the female member for radial movement from a normally expanded position, in which the male member may be freely inserted and removed from the female member, to a contracted position, gripping the male member, preventing its removal and locking it in a fixed articulated relationship with the female member. A load ring is also carried by the female member for axial movement from a first position, allowing the gripping assembly to assume its normally expanded position, to a second position engaging and forcing the gripping assembly into its contracted position.

The gripping assembly preferably comprises a plurality of rigid segments, separated by a plurality of resilient segments, but together which form a generally continuous ring. The resilient segments are circumferentially compressible to permit movement of the gripping assembly to its contracted position and may be bonded to the rigid segments of the ring.

The load ring is provided with an internal cam surface engageable with corresponding cam surfaces on the rigid segments of the gripping assembly to effect movement of the gripping assembly to its contracted position upon axial movement of the load ring from its first to its second position. The load ring, unlike articulated couplings of the prior art, moves from its first to second position in an axial direction away from the conduit connected to the ball member. This assures that there are no force components tending to force the ball member out of the female member. The load ring is simply attached to the female member by conventional flange type connectors such as studs and nuts. However, the nuts are located on the side of the female member opposite the load ring. This reduces the overall length of the female coupling member, allows greater misalignment between the male and female members and assures easy engagement of the nuts with a wrench.

The resulting coupling is especially useful in submarine connections. Divers place the male member in the female member, which is already equipped with the necessary gripping assembly and load ring. This operation is facilitated by the fact that the ball joint design makes it possible to connect two conduits which are out of alignment by as much as twenty degrees. Once the male member is properly inserted in the female member, the divers simply have to axially displace the load ring by turning the nuts on the studs which connect the load ring to the female member. Many other objects and advantages of the invention will be apparent from reading the specification which follows in conjunction with the accompanying drawings.

BRIEF DESCRIPTION OF THE DRAWINGS

FIG. 1 is a longitudinal section of a coupling, according to a preferred embodiment of the invention, illustrating the female and male members prior to connection thereof and showing the gripping assembly in an expanded position;

DESCRIPTION OF THE PREFERRED EMBODIMENTS

Figure 2:
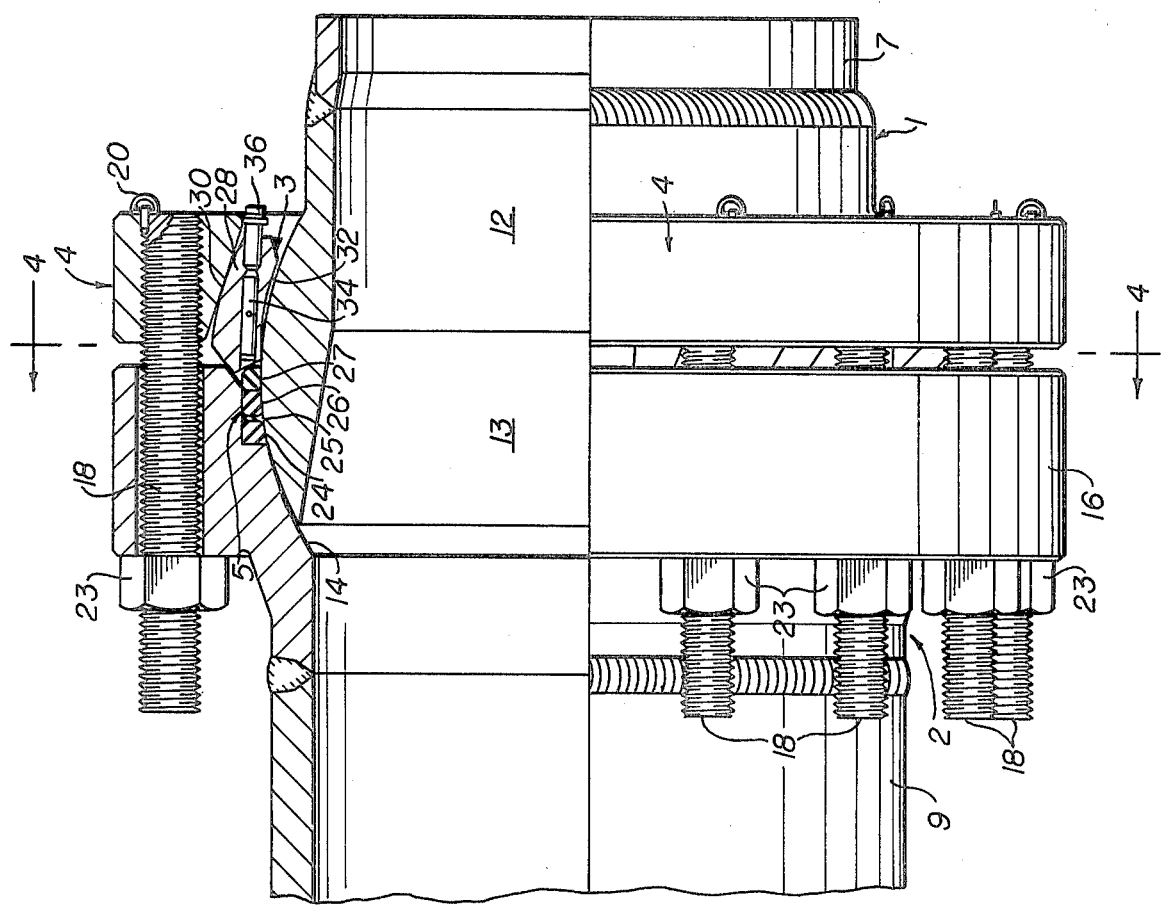
FIG. 2 is a longitudinal section of the coupling of FIG. 1, showing the coupling after engagement of the female member by the male member and after movement of the gripping assembly to its contracted position, gripping and holding the two members rigidly together in an articulated fashion.

Referring first to FIG. 1, the coupling apparatus of the present invention comprises a male member 1, a female member 2, a gripping assembly 3, load ring 4, and seal assembly 5. The male member 1 is adapted for connection, by such as welding at 6, to a conduit 7 which may form a section of a pipeline. The female member 2 is adapted, by such as welding at 8, for connection to another conduit 9 which may form another section of a pipeline.

The male member 1, which may also be referred to as the ball member of a ball and joint socket, has a radially enlarged end portion 10, preferably with an external spherical surface 11 thereon. The ball member also has a flow passage 12 whose axis is generally coincident with the axis of conduit 7. The flow passage 12 may be provided with a frusto-conical or flared portion 13 whose cross sectional area increases in a direction away from the welded area 6.

The female member 2, which also may be referred to as the socket of a ball and socket joint, is provided with an internal spherical surface 14 and is adapted to receive the ball member in mating engagement therewith. The corresponding spherical surfaces 11 and 14 allow at least some degree, e.g. up to twenty degrees, of misalignment between the two members.

The female member 2 is provided with an annular recess terminating inwardly in an annular shoulder 15 for receiving seal assembly 5. Extending radially outwardly from the female member 2 is a flange portion 16 around which is provided a plurality of fastener holes 17 for receiving fastener members such as threaded studs 18.

The load ring 4 is attached to the female member 2 by the studs 18 which are threadedly received in threaded holes 19 provided therefor. If desired, holes may be drilled partially in studs 18 and partially in the load ring 4 and pin member 20 inserted therein. The pin members prevent rotation of the studs 18 relative to the threaded hole 19. The outer surface 21 of the load ring 4 is generally cylindrical and its ends generally flat. The inner surface 22 of the load ring 4 is frusto-conical, converging toward the axis of the female member 2, but in a direction away from the female member. It will be noted that both ends of the load ring 4, its outer surface 21 and inner surface 22 are all exposed to the environment surrounding the coupling.

The studs 18 by which the load ring 4 is attached to the female member 2 project rearwardly through the holes 17 of the female member flange 16 for engagement by fastener members, in this case nuts 23. It is of course well understood that turning of the nuts 23 so as to further engage the studs 18 will force the load ring 4 from a first position, as shown in FIG. 1, to an axially displaced second position closer to the flange portion 16. It should be noted that placement of the nuts 23 behind the flange portion 16, rather than adjacent load ring 4, reduces the overall length of the coupling. It also assures engagement of the nuts 23 by a suitable wrench, a condition which might not exist if the nuts 23 were adjacent load ring 4 when the conduits 7 and 9 are substantially misaligned.

The seal assembly 5 may be made in several ways. The one shown in the drawings includes a primary elastomeric seal 24, a spacer ring 25, secondary elastomeric seal 26, and a rigid, usually metallic, compression ring 27. The interior surfaces of these elements 24, 25, 26 and 27, preferably form a generally continuous spherical surface, with spherical surface 14 of female member 2, for mating engagement with the spherical surface 11 of the male member 1. It is of course well understood that axial compression of the primary and secondary seals 24 and 26 between compression ring 27 and the annular shoulder 15 will cause radial expansion of the seals 24 and 26 for sealing engagement with the seal recess of female member 22 and with the spherical surface 11 of male member 1, if the male member 1 is inserted into the female member 2.

Figure 3:
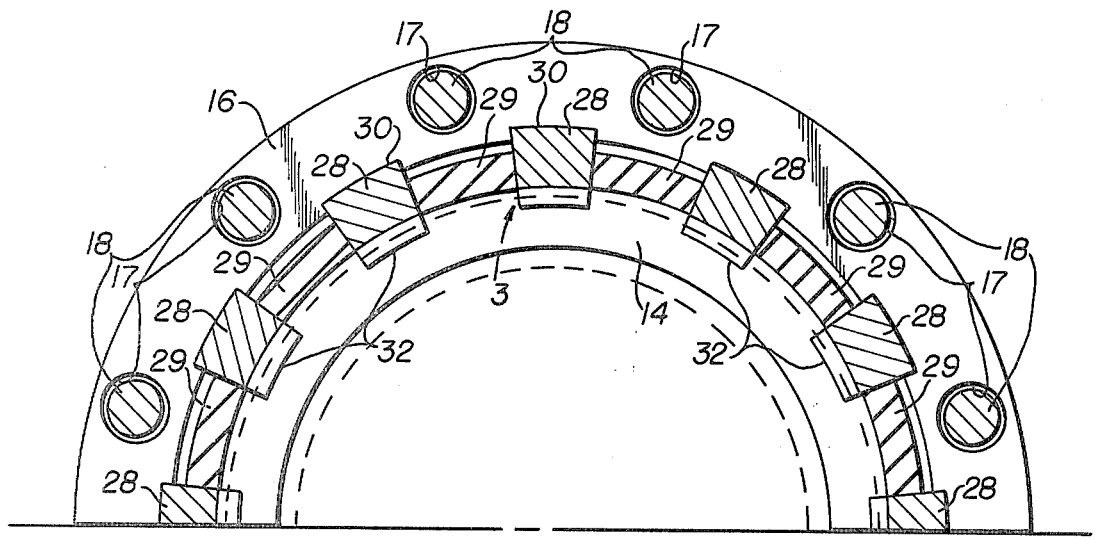
FIG. 3 is a cross sectional view of the female member and gripping assembly in its preconnected position, taken along line 3-3 of FIG. 1.
Figure 4:
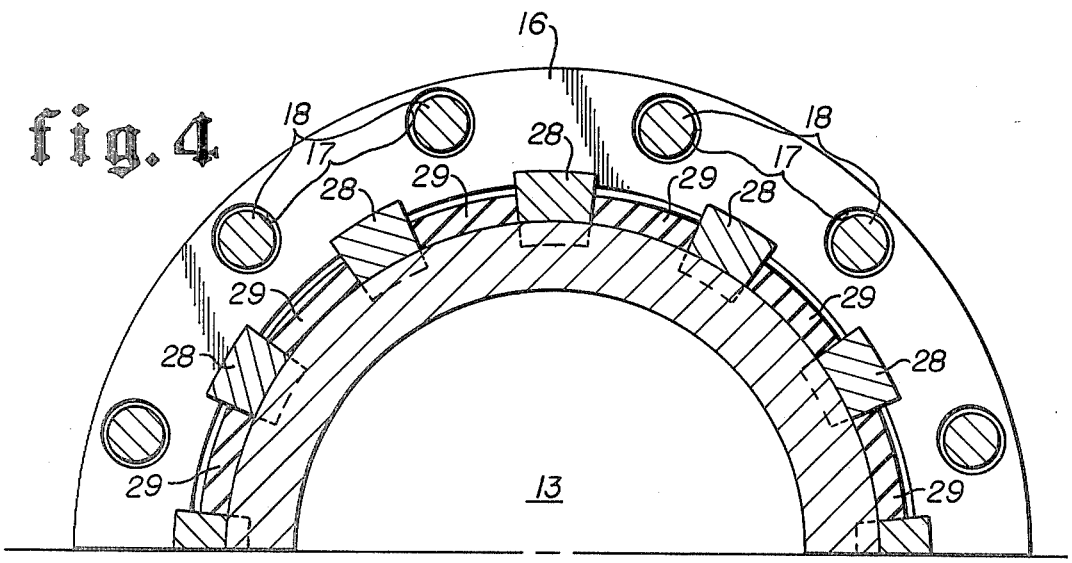
FIG. 4 is a cross sectional view of the female and male members and gripping assembly after complete engagement and locking in position, taken along lines 4-4 of FIG. 2.

The gripping assembly 3 is also carried with the female member 2 and load ring 4 in a coaxially aligned disposition therewith. Referring also to FIG. 3, the gripping assembly 3 comprises a plurality of rigid, preferably metallic, segments 28 separated by a plurality of resilient, preferably elastomeric, segments 29 which together form a generally continuous ring. The resilient segments 29 are preferably bonded to the rigid segments 28 and may actually be molded with the rigid segments 28 in place. Due to the resilient segments 29, the gripping assembly 3 is radially movable from a normally expanded position, as shown in FIGS. 1 and 3, to a contracted position, as shown in FIGS. 2 and 4. The radial thickness of the resilient segments 29 is less than the radial thickness of the rigid segments 28 providing recessed areas between the rigid segments 28 which will allow for radial expansion of the resilient segments 29 upon circumferential compression thereof.

The outer surfaces or faces 30 of the rigid segments 28 are preferably and generally tapered in a direction corresponding with the frusto-conical cam surface 22 of the load ring 4. The inner faces of the rigid segments 28 may be formed by spherical surfaces 32. These gripping surfaces 32 may be provided with teeth or other frictional means for better gripping engagement with the spherical surface 11 of the ball member 1, as will be more fully understood thereafter. At least some of the rigid segments 28 may be provided with a slightly inclined hole in which may be disposed a pin member 34 for axial movement between a retracted position, within the gripping assembly 3, to an extended position engaging the compression ring 27 of the seal assembly 5. The holes in which the pins 34 are disposed may be counterbored and threaded at 35 to receive, as shown in FIG. 2, a set screw 36 (see FIG. 2) the purpose of which will be more fully understood hereafter.

Statement of Operation

Referring now to all of the drawings, the operation and installation of the coupling apparatus of the present invention will be described. After the male and female members 1 and 2, respectively, are attached to their respective conduits 7 and 9, the male member 1 is inserted into the female member 2 with all components being essentially in the position shown in FIG. 1. It will be noted that the gripping assembly 3 is in its normally expanded position so that the inner gripping surfaces 32 and 33 do not interfere with free insertion and removal of the male member 1 into and from the female member 2. It will also be noted that the load ring 4 is in its first position, farthest axially spaced from the flange portion 16 of female member 2.

After the male member 1 has been inserted into the female member 2, the spherical surface 11 thereon engaging the spherical surface 14 and the seal member 5 within the female member 2, it is necessary to move the gripping assembly 3 to its contracted position for gripping the enlarged end portion 10 of the male member and preventing its removal from the female member 2. This is accomplished by moving the load ring 4, in the same direction as insertion of the male member 1 into the female member 2, from the first position of FIG. 1 to a second position engaging and forcing the gripping assembly 3 into its contracted position, as illustrated in FIGS. 2 and 4. As this movement takes place, the frusto-conical surface 22 of the load ring 4 bears against the outer face 30 of rigid segments 28 camming the gripping surfaces 32 into gripping engagement with the spherical surface 11 of the ball member 1.

Figure 5:
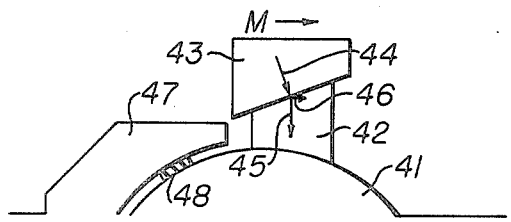
FIG. 5 is a force diagram illustrating force components existing in ball and joint couplings of the prior art.
Figure 6:
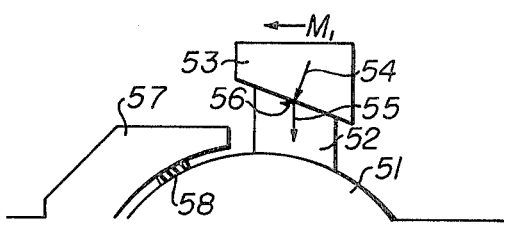
FIG. 6 is a force diagram illustrating force components of the ball and joint coupling of the present invention.

At this point, a major and distinguishing characteristic of the coupling apparatus of the present invention should be mentioned. This characteristic may best be described with reference to the schematic force diagrams of FIGS. 5 and 6, FIG. 5 illustrating the prior art and FIG. 6 illustrating the coupling apparatus of the present invention. In the prior art, as illustrated in FIG. 5, the gripping element 42 is cammed into gripping engagement with the ball member 41 by movement of a load ring or the like 43 in the direction illustrated by arrow M. The normal gripping force as applied to the engaged surface of gripping element 42 is illustrated by force arrow 44. The force arrow may be broken down into a vertical component 45 and a horizontal component 46. While the vertical component 45 is the major force component and is properly directed against the ball member 41 for firmly gripping the ball, the minor and horizontal component 46 is in a direction opposing entry of the ball member 41 into the socket member 47. The force component represented by arrow 46, while small, may be enough to prevent effective mating of the ball 41 with the socket 47 or to prevent proper sealing of the seal member 48 between the ball 41 and socket 47.

In contrast, and as represented in FIG. 6, the load ring 53 of the present invention moves in a direction as represented by arrow $M_1$, opposite of the prior art, toward the socket member 57. The normal force and its vertical and horizontal components are represented by arrows 54, 55 and 56, respectively. The vertical component 55 is essentially the same magnitude and direction as the vertical component 45 of the prior art. However, it will now be noted that the horizontal component 56, while equal in magnitude is in a direction opposite that of the horizontal component 46 of the prior art. The horizontal component 56 is in a direction toward the socket member 57. Thus, in addition to the radial gripping force 55, there is a horizontal force 56 which tends to move the ball member 51 toward greater contact with socket member 57 and toward positive and further sealing of the seal member 58.

While the various elements of FIG. 6 are numbered differently and may appear different than the coupling apparatus described with reference to FIGS. 1—4, the principles are the same. This characteristic of the coupling apparatus of the present invention assures continued positive engagement of the ball or male member with the socket or female member and assures that the seal assembly, as illustrated at 5 in FIGS. 1—4, remains in a positive sealing relationship between the male and female members 1 and 2, respectively. This is extremely important in submarine installations where leakage and spillage cannot be tolerated and where it is necessary that a completely sealed and rigidly articulated joint be established for lengthy periods of time.

When sufficient forces have been applied to the gripping assembly 3 and seal assembly 5, via load ring 4, rotation of the fastener nuts 23 can be ceased. The proper amount of force may be predetermined and applied by a torque wrench or the like. If desired, the nuts 23 can be replaced by a stud tensioning device by which a hydraulic or other force may be applied to the studs without the use of a wrench.

If for some reason, after the gripping assembly 3 is in its contracted position, the seal assembly 5 is not properly sealing between the male and female members 1 and 2, set screws 36 may be threadedly engaged in the threaded holes 35 provided therefor in the rigid segments 28. As the set screws are rotated by a suitable tool, they engage the ends of pins 34 and as further rotation takes place, the pins 34 project out of the segments 28 into engagement with the compression ring 27 of the seal assembly 5. Engagement of the pins 34 with compression ring 27 and further rotation of the set screws 35 causes an axial force to be applied to the seal assembly 5, further compressing primary and secondary seals 24 and 26, respectively, and radially expanding them until the necessary sealing force is obtained, stopping any leak or seepage thereby. Thus, the leakage can be stopped without expensive disassembly of the entire coupling. This is especially important when the line is full of product and when any disassembly of the coupling would result in pollution of the surrounding environment.

If it is necessary to disassemble the coupling apparatus of the present invention, it can be easily done simply by loosening or unthreading the nuts 23, allowing the load ring 4 to return to its first position away from the flange 16. With the load ring 4 in its first position (as shown in FIG. 1), the gripping assembly 3 is allowed to return to the normally expanded position of FIG. 1 so that the male member 1 can be removed from the female member 2 without interference from the gripping assembly 3. If for some reason, the gripping assembly 3 does not expand of its own compressed forces, it will be cammed into such position by axial movement of the male member 1 away from the female member 2.

As already explained, the coupling apparatus of the present invention is superior to the ball and joint couplings of the prior art suitable for connecting misaligned sections of pipe in that the axial or horizontal forces applied to the gripping assembly are in a direction tending to increase the engagement of the ball with the socket, whereas the ball and socket couplings of the prior art are just the opposite. In addition, the gripping assembly of the present invention is much improved over gripping assemblies of the prior art. With the gripping assembly of the present invention, no positive retraction or expansion elements are required, the gripping ring inherently taking care of this problem. Still further, the load ring or means for applying a gripping force to the gripping assembly is freely exposed to the environment surrounding the coupling apparatus, preventing any wedging or sticking in place as in load rings of the prior art which are enclosed in a housing. In addition to these and other improved characteristics, the coupling apparatus of the present invention is much simpler to manufacture and operate than those of the prior art. Consequently, it is cheaper to manufacture and maintain, making it more acceptable to the users of such couplings.

While a preferred embodiment and alternatives thereof have been described herein, many variations of the invention can be made by those skilled in the art without departing from the spirit of the invention. Therefore, it is intended that the scope of the invention be limited only by the claims which follow.

We claim:

1. coupling apparatus capable of joining elongated members in an articulated relationship comprising:
   a male member adapted for connection to one of said elongated members and having a radially enlarged end portion with an external spherical surface thereon;
   a female member adapted for connection to another of said elongated members and into which said radially enlarged end portion may be inserted for mating engagement therewith;
   a gripping member, carried by said female member, radially movable from a normally expanded position, in which said male member may be freely inserted and removed from said female member, to a contracted position gripping said enlarged end portion of said male member, preventing removal of said male member and locking it in a fixed articulated relationship with said female member, said gripping member forming a ring comprising a plurality of rigid segments separated by a plurality of resilient segments therebetween, said resilient segments being circumferentially compressible to permit movement of said gripping member to said contracted position;
   a load ring carried by said female member and axially movable, in the same direction of insertion of said male member into said female member, from a first positions, allowing said gripping member to assume said normally expanded position, to a second osition engaging and forcing said gripping member into said contracted position; and
   an annular seal member carried by said female member for sealing engagement with said male member upon said movement of said gripping member to said contracted position;
   at least some of said rigid gripping member segments being provided with pin means movable, from a retracted position within said segment to an extended position engaging said seal member for placing an additional sealing force thereon in an axial direction toward said female member.

2. Coupling apparatus as set forth in claim 1 in which said rigid segments of said gripping member are provided with cam surfaces on the outer diameter thereof engageable with corresponding cam surfaces on the inner diameter of said load ring for effecting said movement to said contracted position on said movement of said load ring to said second position.

3. Coupling apparatus as set forth in claim 1 in which the radial thickness of said resilient segments is less than the radial thickness of said rigid segments, said resilient segments being bonded to said rigid segments to form a continuous ring.

4. Coupling apparatus as set forth in claim 1 in which said female member includes a radial flange portion to which said load ring is attached for said axial movement from said first to said second positions, said load ring being attached to said radial flange portion by a plurality of threaded studs whose axes are parallel to the axis of said female member and each of which are provided, on the side of said flange portion opposite the side adjacent to said load ring, with threadedly engaging fastener means for moving and holding said load ring in said second position.

5. Coupling apparatus capable of joining first and second conduits in an articulated relationship comprising:
   a male member adapted for connection to said first conduit and having a radially enlarged end portion with an external spherical surface thereon;
   a female member adapted for connection to said conduit and into which said radially enlarged end portion may be inserted for mating engagement therewith;
   seal means carried by one of said male and female members for fluidtight sealing between said male and female members when matingly engaged;
   a gripping assembly carried by said female member, radially movable from a normally expanded position, in which said male member may be freely inserted through said gripping assembly and into said female member, to a contracted position gripping said enlarged end portion of said male member, actuating said seal means, preventing removal of said male member from said female member and locking said male and female members in a fixed articulated relationship, said gripping assembly comprising a plurality of rigid segments circumferentially separated by a plurality of resilient segments therebetween which together form a substantially continuous ring;
   a load ring carried by said female member and axially movable, in a direction away from said first conduit, from a first position, allowing said gripping assembly to assume said normally expanded position, to a second position engaging and forcing said gripping assembly into said contracted position; and
   secondary seal actuating means carried by said gripping assembly and actuatable externally of said coupling apparatus independently of said load ring for placing an additional sealing force on said seal means when said gripping assembly is in said contracted position, said secondary seal actuating means comprising a plurality of pin members carried by at least some of said rigid segments for axial movement between retracted positions within said rigid segments to extended positions engaging and placing an axially directed force on said seal means in a direction toward said female member.

6. Coupling apparatus as set forth in claim 5 in which said pin members are engageable from externally of said coupling apparatus when said gripping assembly and said load ring are in said contracted and second positions, respectively, for placing said additional sealing force on said seal means.

7. Coupling apparatus as set forth in claim 5 in which said resilient segments are of a radial thickness less than the radial thickness of said rigid segments and are circumferentially compressible to permit said movement of said gripping ring to said contracted position.

8. coupling apparatus as set forth in claim 5 in which said rigid segments are metallic and said resilient segments are of elastomeric material bonded to said metallic segments.

9. coupling apparatus as set forth in claim 5 in which said female member includes a radial flange portion having holes therein in which elongated threaded members connected to said load ring are disposed for engagement by threaded fastener members on the side of said flange portion opposite said load ring.

* * * * *